United States Patent [19]

Kemeny et al.

[11] 4,288,652
[45] Sep. 8, 1981

[54] CORRUGATED OUTER SHEATH GAS-INSULATED TRANSMISSION LINE

[75] Inventors: George A. Kemeny, Pittsburgh; Alan H. Cookson, Churchill Boro, both of Pa.

[73] Assignee: Westinghouse Electric Corp., Pittsburgh, Pa.

[21] Appl. No.: 21,391

[22] Filed: Mar. 16, 1979

[51] Int. Cl.³ .............................................. H01R 4/02
[52] U.S. Cl. .............................. 174/21 C; 174/102 D; 285/412; 285/DIG. 4
[58] Field of Search ................ 174/21 C, 21 R, 16 B, 174/102 D; 285/DIG. 4, 286, 368, 412

[56] References Cited

U.S. PATENT DOCUMENTS

| | | |
|---|---|---|
| 1,771,739 | 7/1930 | Wise ............................... 285/412 X |
| 1,986,419 | 1/1935 | Taylor .................................. 285/412 |
| 3,330,303 | 7/1967 | Fochler ................... 174/102 D UX |
| 3,792,188 | 2/1974 | Cronin . |
| 3,813,475 | 5/1974 | Cronin . |
| 3,944,716 | 3/1976 | Katzbeck . |
| 4,124,236 | 11/1978 | Guidry . |

FOREIGN PATENT DOCUMENTS 2402892  1/1974  Fed. Rep. of Germany ... 285/DIG. 4
1133270  11/1968  United Kingdom .

OTHER PUBLICATIONS

Westinghouse Elec. Corp. Descriptive Bulletin No. 33-650 D WEA, "Type CGI Compressed Gas-Insulated Bus", 4-29-75.

*Primary Examiner*—Roy N. Envall, Jr.
*Attorney, Agent, or Firm*—M. S. Yatsko

[57] ABSTRACT

A gas-insulated transmission line includes two transmission line sections each of which are formed of a corrugated outer housing enclosing an inner high-voltage conductor disposed therein, with insulating support means supporting the inner conductor within the outer housing and an insulating gas providing electrical insulation therebetween. The outer housings in each section have smooth end sections at the longitudinal ends thereof which are joined together by joining means which provide for a sealing fixed joint.

5 Claims, 8 Drawing Figures

CORRUGATED OUTER SHEATH GAS-INSULATED TRANSMISSION LINE

GOVERNMENT CONTRACT

The Government has rights in the invention pursuant to Contract No. ET-78-C-01-2870 awarded by the U.S. Department of Energy.

BACKGROUND OF THE INVENTION

This invention relates generally to high-voltage electrical apparatus and more particularly to a high-voltage, compressed gas-insulated transmission line having a corrugated outer housing.

Compressed gas-insulated transmission lines are being increasingly utilized to transmit large magnitudes of electrical energy. Typical gas-insulated transmission lines include a cylindrical, rigid outer sheath, or outer housing, typically at ground potential, and a high-voltage inner conductor disposed within the outer sheath. An insulating gas, such as sulfur hexafluoride, is utilized inside the outer sheath to electrically insulate the inner conductor from the outer sheath. Insulating spacers are utilized at spaced intervals along the length of the transmission line to insulatably support the inner conductor within the outer sheath.

One disadvantage with the typical gas-insulated transmission line is that the lines themselves are rigid; they cannot be significantly bent or turned to accommodate changes in direction or to avoid unforeseen obstacles within their path. All changes of direction in a transmission line must therefore typically be accomplished through the use of elbows or junction boxes. To overcome this drawback, a new type of gas-insulated transmission line is being investigated. The new type of gas-insulated transmission line utilizes a corrugated outer sheath and a flexible inner conductor to provide flexibility in the transmission line. This flexibility can then be utilized to facilitate changes of direction.

Because both the typical transmission line and the new flexible transmission line are typically fabricated of a plurality of transmission line sections, with lengths typically of the order of 60 feet each, joining means must be utilized for sealingly and fixedly joining the various transmission line sections together. This joining means should be low cost and field-installable, be able to withstand the mechanical forces exerted upon it, and preferably should allow no contamination to enter the interior of the outer housing during the joining process.

SUMMARY OF THE INVENTION

In accordance with this invention, it is found that a more desirable gas-insulated transmission line is provided which comprises first and second transmission line sections each of which includes an elongated, corrugated, tubular outer housing having a smooth end section and an elongated electrical conductor disposed within the outer housing. Means are provided for insulatably supporting the inner conductor within the outer housing, and an insulating gas electrically insulates the inner conductor from the outer housing. The inner conductors in the first and second transmission line sections are electrically connected to each other, and joining means are provided for sealingly, fixedly joining the outer housings to each other at the smooth end sections thereof.

BRIEF DESCRIPTION OF THE DRAWINGS

Reference is now made to the description of the preferred embodiment, illustrated in the accompanying drawing, in which.

DESCRIPTION OF THE PREFERRED EMBODIMENTS

Figure 1:
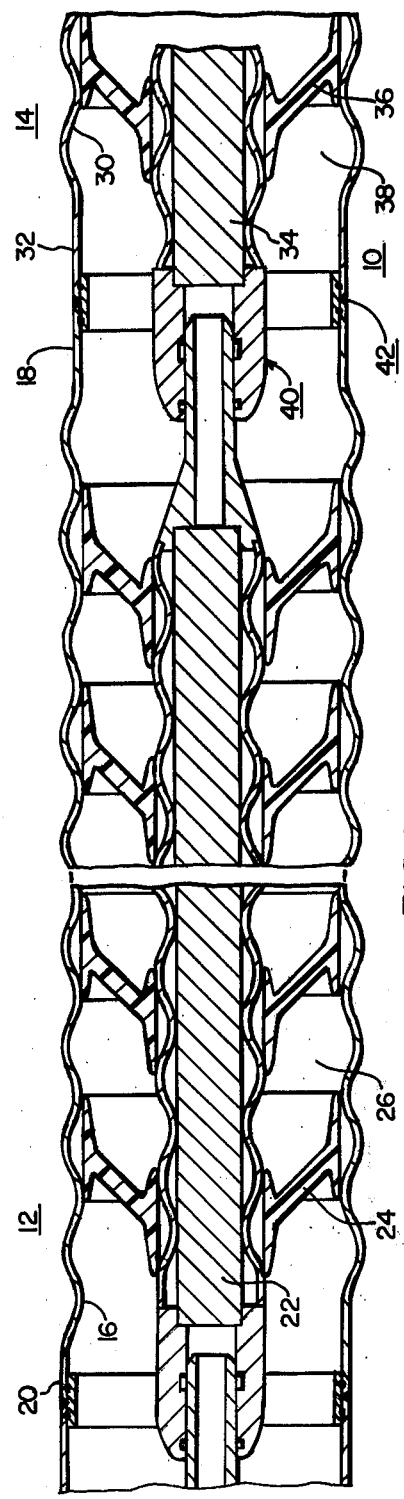
FIG. 1 is a sectional view of a gas-insulated transmission line according to the teachings of this invention.

Referring now more particularly to FIG. 1, therein is illustrated a gas-insulated transmission line 10 according to the teachings of this invention. The transmission line 10 is comprised of a plurality of individual transmission line sections 12, 14 which are joined together to form the transmission line 10. The first transmission line section 12 includes an elongated, corrugated, tubular outer housing 16 having smooth end sections 18, 20 at the longitudinal ends thereof, and an elongated electrical conductor 22 disposed within the outer housing 16 and which is at high electrical potential to the typically grounded outer housing 16. Throughout this application, the term "smooth" as it relates to the end sections means the absence of corrugations of the type present along the main portion of each transmission line section outer housing. The inner conductor 22 would, for example, be at an electrical potential of 138 KV to 1100 KV nominal voltage. A plurality of spaced insulating supports 24 are disposed within the outer housing 16, and serve to insulatably support the inner conductor 22 within the outer housing 16. An insulating gas 26 typical of which is sulfur hexafluoride, functions to electrically insulate the inner conductor 22 from the outer sheath 16.

The second transmission line section 14 is similarly constructed, having an elongated, corrugated, tubular outer housing 30 with a smooth end section 32 at the ends thereof, an inner conductor 34 disposed within the outer housing 30, insulating supports 36 for insulatably supporting the inner conductor 34 within the outer housing 30, and the sulfur hexafluoride insulating gas 38 for electrically insulating the inner conductor 34 from the outer housing 30. As can be seen, the electrical inner conductors 22, 34 are electrically connected to each other, by means such as the plug and socket contact 40, so that the electrical conductors 22, 34 are at the same electrical potential. Additionally, the insulating gas 26 and the insulating gas 38 are in fluid communication with each other and would be the same gas such as sulfur hexafluoride. Joining means 42 are utilized for sealingly and fixedly joining the outer housings 16, 30, and more particularly the smooth end sections 18, 32 to each other.

Figure 2:
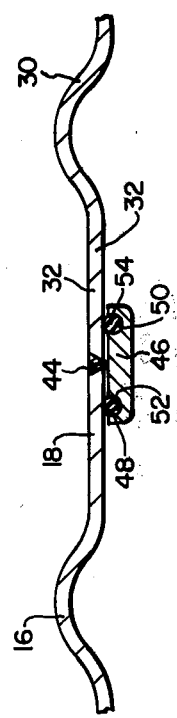
FIG. 2 is a detailed, sectional view of the joining means utilized in the transmission line of FIG. 1 to join together the outer housings of the two transmission line sections.

As illustrated in more detail in FIG. 2, the joining means 42 comprises a weld bead 44 which is disposed between, contacts, and joins the smooth end sections 18, 32. As illustrated, the outer housing smooth end sections 18, 32 are disposed adjacent to each other in an end-to-end abutting relationship, and the weld bead 44 is disposed intermediate the two end sections 18, 32. A tubular welding backup ring 46 is disposed adjacent the smooth end sections 18, 32 and the weld bead 44 on the interior side thereof. The welding backup ring 46 has a pair of circumferential grooves 48, 50 therein on opposite sides of the weld bead 44, and a pair of preferably O-ring seals 52, 54 are disposed in the grooves 48, 50 respectively and contact both the welding backup ring 46 and the smooth end sections 18, 32. Thus, the seals 52, 54 function to prevent any weld spatter from the weld bead 44 from entering the interior of the outer housings 16, 30. In this manner, contamination particles are prohibited from entering the transmission line 10, which contamination particles could initiate breakdown of the transmission line 10.

Figure 3:
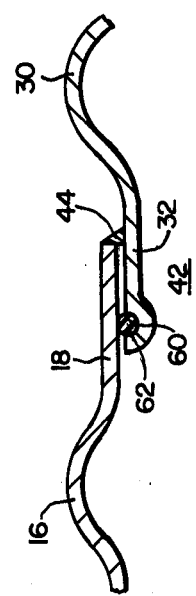
FIGS. 3, 4, 5, 6, and 7 are modifications of the joining means illustrated in FIG. 2.

A modification of the joining means 42 of FIG. 2 is shown in FIG. 3. This modification, the outer housing smooth end sections 18, 32, are disposed in an overlapping relationship with respect to each other with the smooth end section 32 being disposed interiorly of the other smooth end section 18. The weld bead 44, as before, contacts and joins the two outer housing smooth end sections 18, 32. The smooth end section 32 has a circumferential groove 60 therein adjacent the other smooth end section 18, and an O-ring seal 62 is disposed in this circumferential groove 60 and contacts both the smooth end section 18 annd the smooth end section 32. An additional feature of the joining means illustrated in FIG. 3 is that slight lengthening or shortening of the transmission line 10 can be accomplished by varying the amount of overlap between the two smooth end sections 18, 32.

Figure 4:
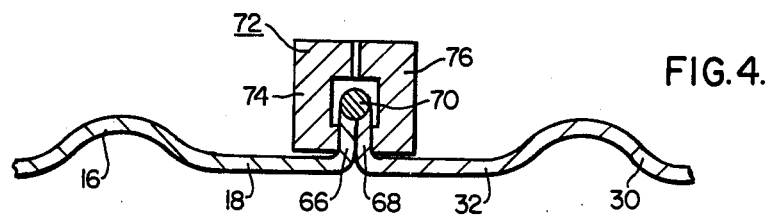

Referring now to FIG. 4, therein is illustrated a further modification of the joining means 42. In this modification, each smooth end section 18, 32 has a radially-outwardly-extending annular flange 66, 68 respectively at the endmost portion thereof. The flanges 66, 68 are disposed adjacent to each other in an abutting relationship, and a weld bead 70 contacts and joins both flanges 66, 68. To achieve a close fit, clamping means 72 may be utilized to compress the flanges 66, 68 against each other prior to welding. The clamping means 72 would typically comprise first and second elements 74, 76 respectively which are pulled together by means such as bolts (not shown).

Figure 5:
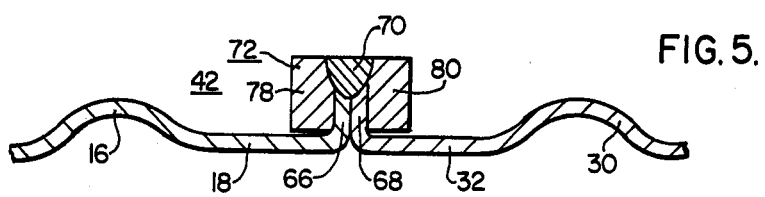

As illustrated in FIG. 5, the clamping means 72 may instead comprise blocks 78, 80 which are paressed against the flanges 66, 68 by means such as a hydraulic press (not shown). The two blocks 78, 80 are then included within the weld 70 formed, such that the weld bead 70 contacts and joins not only the two flanges 66, 68, but also contacts and joins the two blocks 78, 80 of the clamping means 72.

Figure 6:
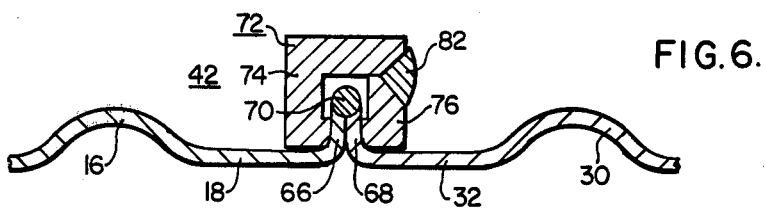

Alternatively, as illustrated in FIG. 6, the clamping means can be the two movable elements 74, 76, which are movable with respect to one another to provide the compressing force against the flanges 66, 68. In this modification, though, the two elements 74, 76, are joined together subsequent to the formation of the weld bead 70, by the weld bead 82, which contacts and joins the two clamping elements 74, 76. Thus, in this modification, there are two weld beads 70, 82 which function to fixedly join the two outer housing smooth end sections 18, 32 together.

Figure 7:
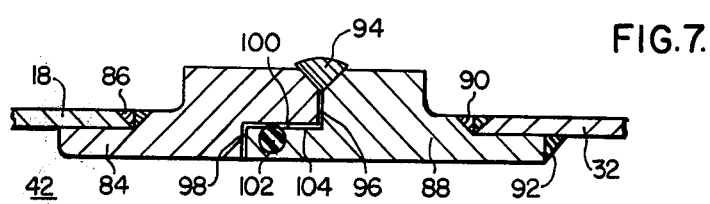

A still further modification of the joining means 42 is illustrated in FIG. 7. In this modification, a first annular housing extension 84 is fixedly secured to the first outer housing smooth end section 18 by means such as the weld 86. A second annular housing extension 88 is fixedly secured, by means such as the welds 90, 92, to the other smooth end section 32. Both annular housing extensions 84, 88 extend longitudinally outwardly from their respective end sections 18, 32, and are disposed adjacent to each other. As shown, a weld bead 94 is then utilized to contact and join the first and second annular housing extension 84, 88 respectively. Also as illustrated, the first and second housing extensions, 84, 88 can be formed of a shape so as to be disposed adjacent to each other in an end-to-end abutting relationship and, additionally, in an overlapping relationship. Thus, as illustrated, the mating surfaces 96 and 98 of the housing extensions 84, 88 meet in an end-to-end abutting relationship, while the mating surfaces 100 meet in an overlapping relationship. Also, if desired, an O-ring seal 102 may be disposed in the joint 104 formed between the first and second housing extensions 84, 88 so as to prevent the entrance of any weld splatter from the weld bead 94 into the interior of the outer housings 16, 30.

Figure 8:
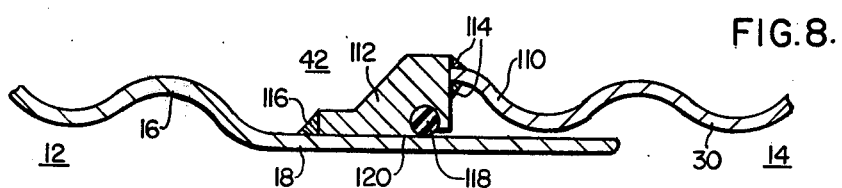
FIG. 8 is a modification of the joining means illustrated in FIG. 2, and which utilizes a transmission line having a corrugated end section.

A still further modification of the joining means 42 is illustrated in FIG. 8. In this modification, though, the second transmission line section 14, and more particularly its outer housing 30, does not have a smooth end section but instead its end section 110 remains corrugated as is the rest of the outer housing 30. The first transmission line section 12 has a smooth end section 18 as previously described. The joining means 42 in this modification comprises a tubular housing extension 112 which is fixedly secured to the outer housing corrugated end section 110 and which is disposed adjacent to the first outer housing smooth end section 18. The tubular housing extension 112 is fixedly secured to the corrugated outer housing end section 110 by means such as the welds 114. A weld bead 116 contacts and joins the housing extension 112 and the first outer housing smooth end section 18 to provide a sealingly and fixedly joining thereof. Additionally, if desired, sealing means 118 may be utilized to seal the joint 120 formed between the housing extension 112 and the smooth end section 118.

Thus, as can be seen, herein are described numerous means for joining together two sections of a corrugated outer housing of a gas-insulated gas transmisson line which provide a low cost, field-installable, mechanically stable joint.

We claim as our invention:

1. A high-voltage gas-insulated transmission line comprising:

first and second transmission line sections each comprising an elongated, corrugated tubular outer housing having a smooth end section, an elongated electrical conductor disposed within said outer housing, means for insulatably supporting said conductor within said outer housing, and an insulating gas electrically insulating said conductor from said outer housing, said electrical conductors being electrically connected to each other; and joining means for sealingly fixedly joining said outer housings to each other at said smooth end sections thereof; said joining means comprising:

a first annular housing extension fixedly secured to one of said smooth end sections and extending longitudinally outwardly therefrom;

a second annular housing extension fixedly secured to the other of the smooth end sections and extending longitudinally outwardly therefrom, said first and second annular housing extensions being disposed adjacent to each other; and a weld bead disposed between, contacting and joining said first and second annular housing extensions.

2. The transmission line according to claim 2 wherein said first and second housing extensions are of a shape so as to be disposed adjacent to each other in an end-to-end abutting and overlapping relationship.

3. The transmission line according to claim 2 including a seal disposed in the joint formed between said first and second housing extensions and contacting said first and second housing extensions.

4. A high-voltage gas-insulated transmission line comprising:

an elongated, tubular outer housing comprising a first elongated, corrugated outer housing section having a smooth end section, a second elongated corrugated outer housing section having a corrugated end section, and joining means for sealingly fixedly joining said first and second outer housing sections;

an elongated, inner conductor disposed within said outer housing;

means for insulatably supporting said inner conductor within said outer housing; and an insulating gas for electrically insulating said inner conductor from said outer housing;

said joining means comprising a tubular housing extension fixedly secured to said second outer housing end section and disposed adjacent said first outer housing section smooth end section, and a weld bead contacting and joining said housing extension and said first outer housing section smooth end section.

5. The transmission line according to claim 4 including sealing means disposed in the joint formed between said housing extension and said first outer housing section smooth end section for providing sealing therebetween.

* * * * *